H. HILDEBRAND.
MOTOR CYCLE.
APPLICATION FILED JULY 7, 1920.
1,410,180.
Patented Mar. 21, 1922.
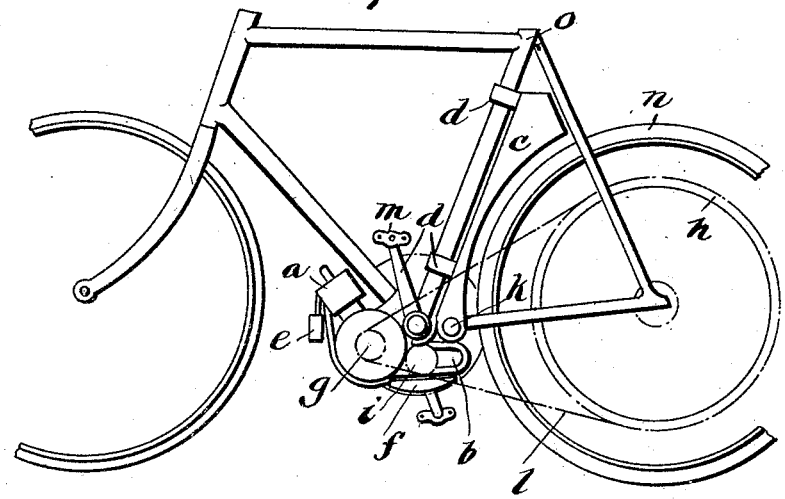
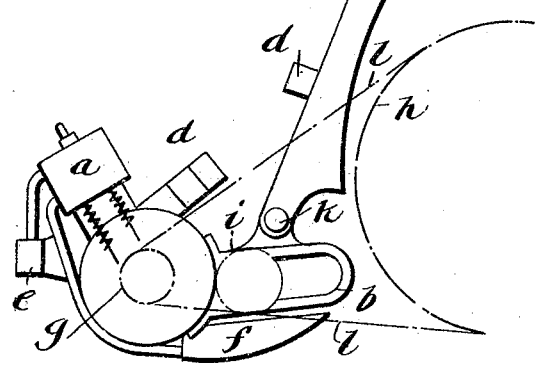
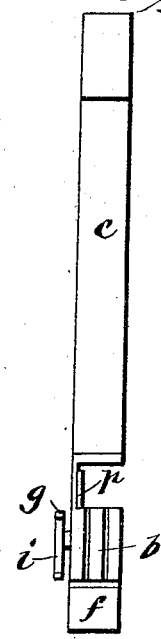
Inventor
Heinrich Hildebrand
By Lawrence Langner
Attorney

UNITED STATES PATENT OFFICE.

HEINRICH HILDEBRAND, OF BERLIN-SCHONEBERG, GERMANY.

MOTOR CYCLE.

1,410,180.  Specification of Letters Patent.  Patented Mar. 21, 1922.

Application filed July 7, 1920. Serial No. 394,603.

*To all whom it may concern:*

Be it known that I, HEINRICH HILDEBRAND, a citizen of the German Republic, and resident of Berlin-Schoneberg, Germany, have invented certain new and useful Improvements in Motor Cycles, (for which I have filed an application in Germany April 4, 1919,) of which the following is a specification.

The invention relates to a motor-equipment which consists of a motor, a tank for storing petrol, benzine, gasoline, or the like, a cooling-device to be operated by water, and certain accessory parts, the whole being assembled in such a manner that the thus obtained self-contained equipment may be affixed to any existing cycle, preferably between the rear wheel and the saddle-pin tube and below the pedal bearing, in order to serve as motoric drive for the respective wheel.

In constructing the equipment in question, value has been attached especially to making its weight lie as deep as possible at the cycle-frame, and attention has been paid also to the point of impairing the total appearance of the cycle only in the smallest measure obtainable and, furthermore, the inner space of the frame remains completely empty. Therefore, the motor with the ignition-device is arranged below the pedal-bearing and the fuel-tank and the water-receptacle are arranged between the saddle-pin tube and the rear wheel.

In order to make my invention more clear, I refer to the accompanying drawing, in which similar letters denote similar parts throughout the several views, and in which:

Fig. 1 is a side-view of a cycle which has been an ordinary cycle for foot-drive and has been turned into a motor-cycle by furnishing it with the self-contained motor-equipment in question, some parts of the cycle proper being left away;

Fig. 2 is a diagrammatical representation of the motor-equipment drawn on a somewhat larger scale; and Fig. 3 is a diagrammatical representation of the parts shown in Fig. 2, but seen from the rear.

The details of the equipment are the following: The crank-case of the motor is provided with a clip, and attached to it is the ignition-device $b$ which is provided with a rotary eye $k$ that may also be longitudinally displaceable and may engage the eye of the benzine-tank and water-receptacle $c$. This combined tank and receptacle has two clips $d$, $d$, by means of which the plant may be affixed to the cycle-frame, or to the saddle-pin tube respectively. Below the ignition-device is the exhaust-pot or silencer $f$. $h$ is a chain-wheel rim which is affixed to the spokes of the rear wheel, and $l$ is the chain which connects said rim $h$ with the chain-wheel $g$ of the motor. The chain $l$ is in gear also with the driving-wheel $i$ of the ignition-device whereby a special driving-gear for that purpose is saved.

Attaching the motor-equipment to the cycle-frame is effected as follows: The pedal of the cycle is turned upwards, as shown in Fig. 1, so that the whole motor-equipment may easily be shoved from the left side into the cycle-frame, in such a manner, that the combined benzine-tank and water-receptacle will be situated between the saddle-pin tube and the rear-wheel, as shown in Fig. 1, whereas the ignition-device and the motor, as well as the exhaust-pot, will be situated below the pedal-bearing. The clips $d$ $d$ are affixed to the saddle-pin tube whereby the mounting is finished.

The object of the hinge $k$ is, first, to allow of adjusting the tank and receptacle to any angular position of the saddle-pin tube; second, to allow of disconnecting the tank and receptacle from the other parts in order to permit of an easier packing of all parts if they are to be consigned by rail or ship. Anyhow, instead of disconnecting the tank and receptacle from the other parts, it may merely be turned upon the hinge $k$ in the direction to the motor until contacting with it.

The breadth of the whole equipment is so small (about 70 millimeters) that the pedals of the cycle, or the chain-wheel of the same respectively, can pass along the equipment.

Regulating the gas-mixture, as well as the ignition, is effected by Bowden hand gears.

As the distance between the pedals of cycles of various make is different and also the chain-wheel rim to be attached to the rear wheel is more or less distant from the middle of the pedal-bearing, it is advisable to make the two clips adjustable in horizontal direction in order to be able to displace the motor drive-wheel relatively to the chain.

What I do claim as my invention, and desire to secure by Letters Patent is:

1. A motor equipment adapted to be attached to an ordinary type of bicycle, comprising a motor and a magneto arranged at an angle to fit the cycle frame below the pedal-bearing, a fuel receptacle, and means to affix said parts to the cycle frame.

2. A motor-equipment adapted to be attached to a cycle, comprising a motor and an ignition-device arranged at an obtuse angle to each other to fit the cycle frame below the pedal-bearing, a fuel receptacle, and means to affix said parts to the cycle frame.

3. A motor-equipment adapted to be attached to a cycle, comprising a motor and an ignition-device adapted to be arranged below the pedal-bearing, a combined-fuel-tank and water-receptacle adapted to be arranged between the saddle-pin tube and the rear wheel, and means to affix said parts to the cycle-frame.

4. A motor-equipment adapted to be attached to a cycle, comprising a motor, a crank-case and an ignition-device adapted to be arranged below the pedal-bearing, said ignition-device being arranged at an obtuse angle to said crank-case, a combined fuel-tank and water-receptacle adapted to be arranged between the saddle-pin tube and the rear wheel and hingedly connected to said ignition-device, and means to affix all of said parts to the cycle-frame.

5. A motor-equipment adapted to be attached to a cycle comprising a motor and an ignition-device adapted to be arranged below the pedal-bearing, an exhaust pot arranged below the ignition-device, a slightly curved exhaust-tube extending from the motor below the crank-case, a combined fuel-tank and water-receptacle adapted to be arranged between the saddle-pin tube and the rear wheel, and means to affix said parts to the cycle-frame.

6. A motor-equipment adapted to be attached to a cycle, comprising a motor and an ignition-device adapted to be arranged below the pedal-bearing, a combined fuel-tank and water-receptacle adapted to be arranged between the saddle-pin tube and the rear wheel, means to affix said parts to the cycle-frame, a sprocket wheel driven by the motor, and a sprocket wheel carried by the ignition-device, said sprocket wheels adapted to be connected by a sprocket chain to the sprocket wheel carried by the rear wheel of the cycle.

HEINRICH HILDEBRAND.

Signed in the presence of—
FRITZ HILDEBRAND,
HEINRICH L. HILDEBRAND.